UNITED STATES PATENT OFFICE.

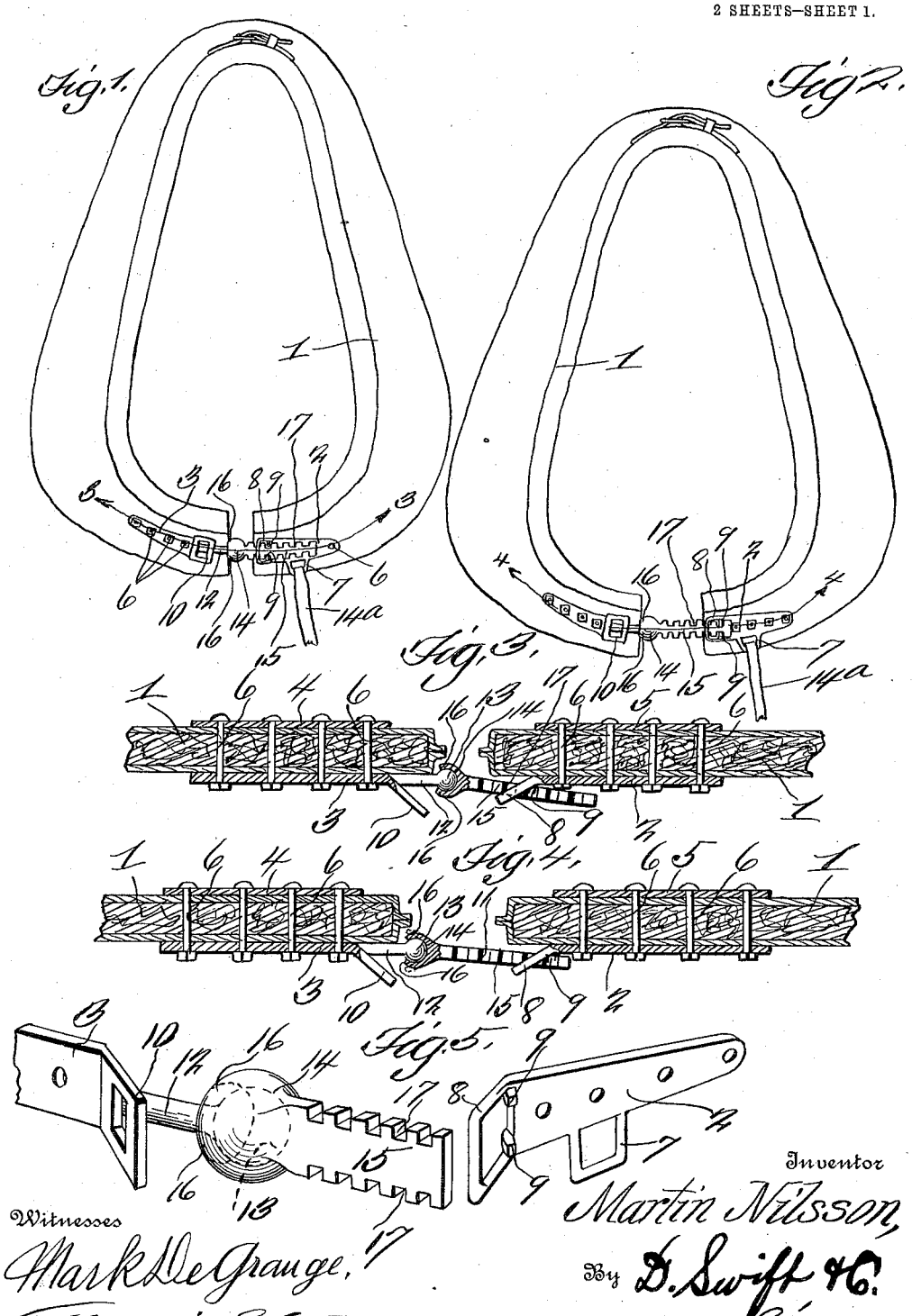

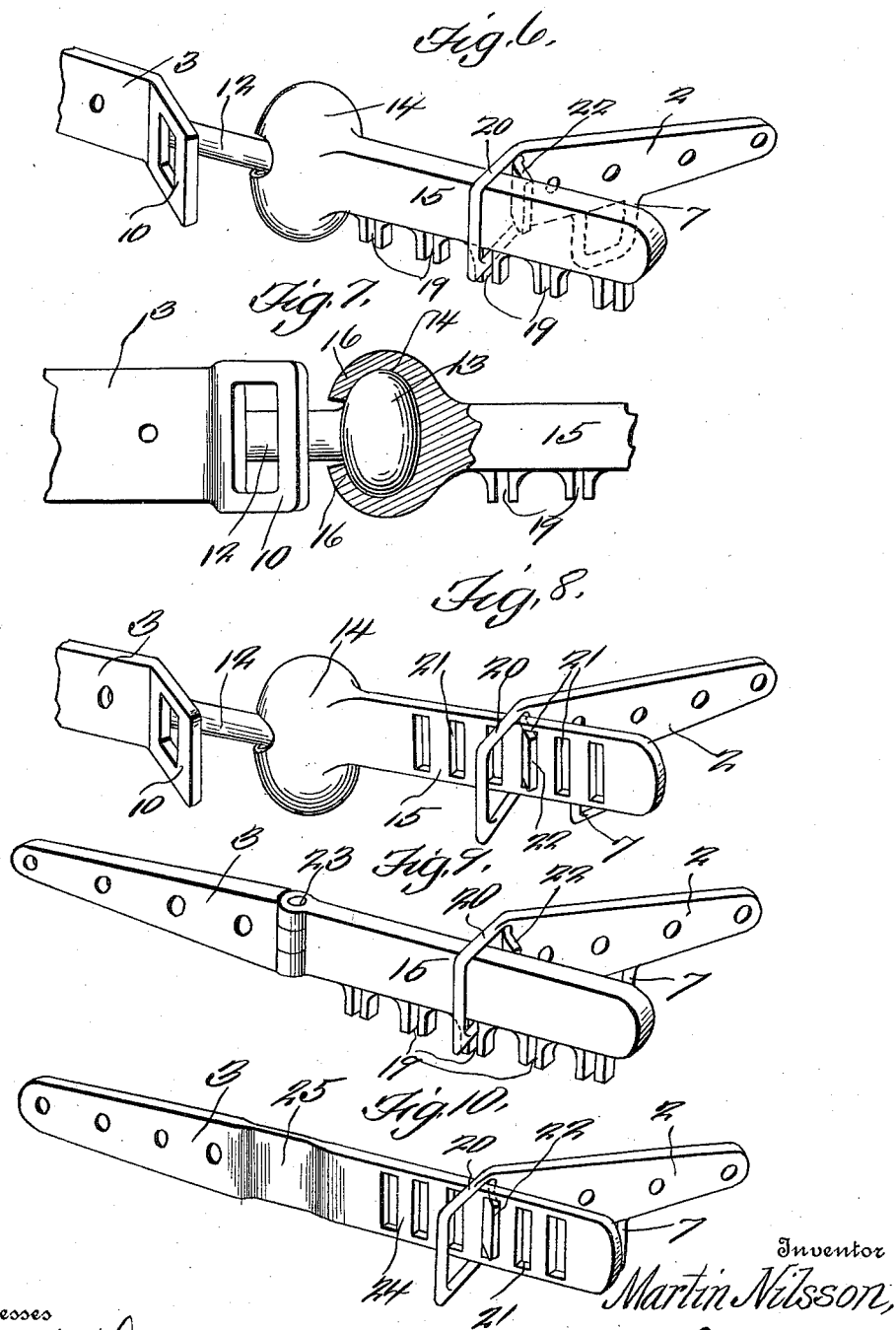

MARTIN NILSSON, OF MARION, NEBRASKA.

ADJUSTABLE HORSE-COLLAR ATTACHMENT.

1,078,802.  Specification of Letters Patent.  Patented Nov. 18, 1913.

Application filed March 29, 1913. Serial No. 757,634.

*To all whom it may concern:*

Be it known that I, MARTIN NILSSON, a citizen of the United States, residing at Marion, in the county of Redwillow and State of Nebraska, have invented a new and useful Adjustable Horse-Collar Attachment; and I do hereby declare the following to be a full, clear, and exact description of the invention, such as will enable others skilled in the art to which it appertains to make and use the same.

This invention relates to a new and useful adjustable horse collar fastener.

Through experience, it has been found that horses when turned out during the winter become fat and pursy, and when a horse is started to work at the spring of the year, his collar fits him closely, but after the horse gets in good working order, thereby losing the fat, his collar is substantially three inches too wide, and by fly time, the collar is from four to five inches too wide. Further, it has been found that a collar which is too loose rubs sores upon the shoulders of the horse, which is very annoying to the animal. Moreover, it has been discovered that when a collar fits the animal closely, all sores and the like are prevented, and that the animal will work with greater energy.

Therefore, it is an object of the present invention to have a single collar with a section from substantially three to five inches severed from the lower portion of the collar, with an adjustable collar fastener connected to the severed ends, so that the collar may fit the animal when he is fat, and after the horse is in good working order, the fastener may be adjusted, so that the collar will still fit closely against the shoulders, thereby preventing sores and the like.

A further object of the invention is to improve the general construction of the adjustable horse collar fastener, set forth illustrated and claimed in the application filed January 15, 1913, Serial No. 742,115.

In practical fields it may be found necessary to subject the details of construction to alterations, to which the patentee is entitled, provided the alterations fall within the scope of what is claimed.

The invention comprises further features and combination of parts, as hereinafter set forth, shown in the drawings and claimed.

In the drawings: Figure 1 is a view showing the application of the improved adjustable fastener. Fig. 2 is a view similar to Fig. 1 showing the collar made larger. Fig. 3 is a sectional view on line 3—3 of Fig. 1. Fig. 4 is a sectional view on line 4—4 of Fig. 2. Fig. 5 is an enlarged detail sectional view of the fastener removed. Fig. 6 is a detail perspective view showing a modified construction. Fig. 7 is a detail sectional view of Fig. 6. Fig. 8 is a perspective view showing a modified construction. Fig. 9 is a perspective view showing another modified construction. Fig. 10 is a perspective view showing still another modified construction.

Referring more particularly to the drawings, 1 designates a collar of the usual construction, excepting that a section of substantially three to five inches or the like is severed from the lower portion of the collar. To the severed ends upon the outer face of the collar plates 2 and 3 are secured by means of the plate washers 4 and 5, and the bolts 6. The plate 2 is provided with a loop 7, to which a strap 14ª from a tongue (not shown) is connected. The plate 2 at one end terminates in a loop 8, adjacent the sides of which lugs 9 are provided. The plate 3 terminates at one end in an elongated loop 10, to receive a strap (not shown) of hames (not shown). Connected to one end of the plate 3 adjoining the loop 10 is a shank 12 having a ball 13, which fits the socket 14 of the link latch 15. To arrange the ball 13 in the socket, the socket is first partly formed, leaving the parts 16 shown in dotted lines in Fig. 4 unfinished, then the ball is inserted, and subsequently the parts 16 shown in dotted lines are completely shaped as shown in full lines, by a beating process. In other words, the metal forming the part 16 is hammered or pounded in shape. The opposite side faces of the link latch are provided with notches 17, to receive the lugs 9 when the latch is inserted through the loop 8. Any two opposite notches may receive said lugs, thereby holding the collar in position, and by this arrangement the collar may be adjusted to fit necks of different sizes.

In Figs. 6 and 7 the ball and socket are differently shaped, and the lugs 9 are eliminated, while one side of the link latch is provided with notches 19 to receive one side of the loop 20, of the plate 2.

In Fig. 8, the link latch is constructed with a plurality of elongated slots 21, any one of which is adapted to receive the tongue adjoining the loop 20, said tongue is designated by the character 22.

In Fig. 9 the ball and socket connection is dispensed with and a hinge connection 23 substituted in lieu thereof. Also in Fig. 9 the notches 19 engage one side of the loop 20.

In Fig. 10 the plate 3 and the link latch 24 are made integral, but the metal at 25 is thin enough to afford a flexible connection; while the slots 21 are designed to receive the tongue 22.

From the foregoing it will be observed there has been produced a simple and efficient adjustable horse collar attachment, having been found desirable and practical, in view of the fact that a collar may be made to fit a horse's neck and the shoulders closely at all times.

The invention having been set forth, what is claimed as new and useful is:—

1. In combination, a collar having a section severed from the lower bend thereof, plates, one secured to each severed end of the collar, one of the plates having a loop, and a link latch having a ball and socket connection to the other plate and insertible through the loop, said loop having adjoining lugs, said link latch having upon opposite faces notches, any two opposite notches being adapted to engage said lug, for adjustably connecting the severed ends of the collar.

2. In combination, a collar having a section severed from the lower bend thereof, plates, one secured to each severed end of the collar, one of the plates having a loop, and a link latch having a ball and socket connection to the other plate and insertible through the loop, said link latch having notches to engage a part of the loop for adjustably connecting the severed ends of the collar.

3. In combination, a collar having a section severed from the lower bend thereof, plates, one secured to each severed end of the collar, one of the plates having a loop, and a link latch having a flexible connection with the other plate and insertible through the loop, said link latch having notches to receive an integral part of the loop for adjustably connecting the severed ends of the collar.

In testimony whereof I have signed my name to this specification in the presence of two subscribing witnesses.

MARTIN NILSSON.

Witnesses:
N. R. RHOADES,
A. C. FURMAN.

---

Copies of this patent may be obtained for five cents each, by addressing the "Commissioner of Patents, Washington, D. C."